(12) United States Patent
Lamprillo

(10) Patent No.: US 7,574,927 B2
(45) Date of Patent: Aug. 18, 2009

(54) TENSIOMETER

(75) Inventor: Stefano Lamprillo, Biella (IT)

(73) Assignee: IRO AB, Ulricehamn (SE)

( * ) Notice: Subject to any disclaimer, the term of this patent is extended or adjusted under 35 U.S.C. 154(b) by 0 days.

(21) Appl. No.: 11/632,153

(22) PCT Filed: Jul. 7, 2005

(86) PCT No.: PCT/EP2005/007365

§ 371 (c)(1),
(2), (4) Date: Jan. 10, 2008

(87) PCT Pub. No.: WO2006/005518

PCT Pub. Date: Jan. 19, 2006

(65) Prior Publication Data

US 2008/0250872 A1 Oct. 16, 2008

(30) Foreign Application Priority Data

Jul. 14, 2004 (DE) .................... 10 2004 034 006

(51) Int. Cl.
*G01L 5/10* (2006.01)
(52) U.S. Cl. .................................. 73/862.41
(58) Field of Classification Search ............ 73/760, 73/862.41
See application file for complete search history.

(56) References Cited

U.S. PATENT DOCUMENTS

| | | | |
|---|---|---|---|
| 4,110,654 A | 8/1978 | Paul | |
| 5,545,987 A * | 8/1996 | Schutt et al. | 324/219 |
| 6,095,449 A | 8/2000 | Gallo et al. | |
| 6,206,423 B1 * | 3/2001 | Wier | 280/801.1 |
| 6,691,744 B1 | 2/2004 | Birger | |
| 6,877,261 B2 * | 4/2005 | Milton | 38/102.8 |
| 6,895,879 B1 * | 5/2005 | Kronenberger | 112/229 |
| 2009/0030496 A1 * | 1/2009 | Kaufmann et al. | 623/1.12 |

FOREIGN PATENT DOCUMENTS

| | | |
|---|---|---|
| DE | 36 09 623 A1 | 10/1987 |
| DE | G 90 00 443.4 | 3/1990 |
| DE | 102 49 278 A1 | 6/2004 |
| EP | 0 475 001 A2 | 3/1992 |
| WO | WO 2004/039714 A1 | 5/2004 |

OTHER PUBLICATIONS

International Search Report dated Oct. 26, 2005 for PCT/EP2005/007365 (3 pages).

* cited by examiner

*Primary Examiner*—Max Noori
(74) *Attorney, Agent, or Firm*—Flynn, Thiel, Boutell & Tanis, P.C.

(57) ABSTRACT

A tensiometer for measuring thread tension, provided with a bending element fixed at one end and tensioned at the other end by the thread, at least one sensor element and damping device for oscillating the bending element. The damping device has at least one mass damper fixed to the bending element by means of a spring body.

9 Claims, 1 Drawing Sheet

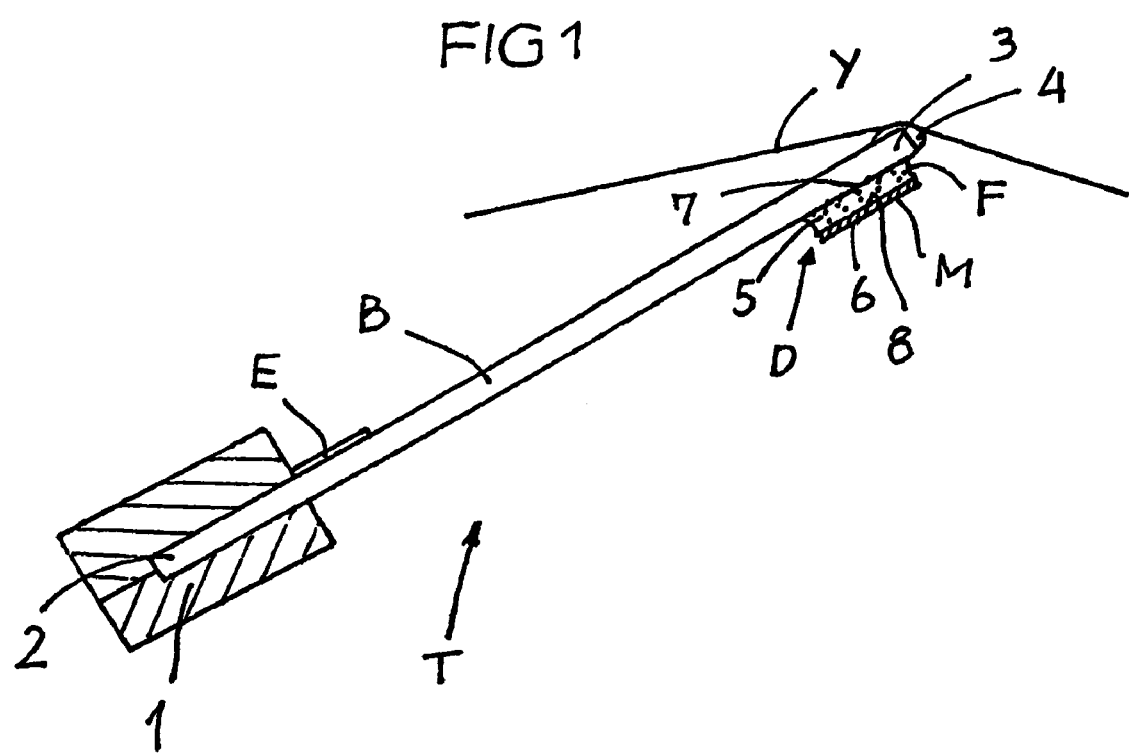

TENSIOMETER

FIELD OF THE INVENTION

The invention relates to a tensiometer for measuring thread tension.

BACKGROUND OF THE INVENTION

The tensiometer known from DE 102 49 278 A (WO 2004/039714 A) is equipped with a viscosity damper as the damping device. A pin rigidly secured to the lower side of the bending element is inserted without contact into a cavity which is stationarily arranged in relation to the bending element, and which contains a damping liquid.

In the case of the tensiometer known from DE 90 00 443 U, an elastic and highly damping mass is directly anchored at the bending element. The mass is temperature-insensitive, and the mass e.g. consists of fluoric rubber. The position of the mass can be adjusted in a longitudinal direction of the bending element in order to tune the damping effect to a certain frequency.

SUMMARY OF THE INVENTION

It is an object of the invention to provide a tensiometer which is structurally simple and which can be economically manufactured, and which is efficiently attenuated against vibrations relative to the fixing location where vibrations are induced by the thread and by environmental influences.

This object can be achieved with the tensiometer accordint to the invention, which includes a bending element which is fixed at one end and can be actuated at another end by the thread, at least one sensor element carried by the bending element, and a damping device for oscillating the bending element, wherein the damping device comprises at least one absorbing mass secured to the bending element by a spring body.

When the bending element is oscillated relative to the fixing location, the absorbing mass is also excited by the oscillations which are allowed by the spring body. With a corresponding tuning between the bending element, the spring body and the absorbing mass, the natural oscillations of the absorbing mass erase the oscillations of the bending element to a large extent, because the spring body permanently dissipates oscillating energy. The tensiometer is structurally simple and can be economically manufactured, because the spring body and the absorbing mass are simple and low price components, and can be secured easily at the bending element.

The absorbing mass, in a preferred embodiment, is substantially smaller than the mass of the bending element outside the fixation location. For this reason, the damping device effectively dampers oscillations of the bending element without excessively increasing the total mass.

The resonance frequency of the spring body, in a preferred embodiment and of the absorbing mass are adjusted at least substantially according to the resonance frequency of the bending element. In this regard, the resonant oscillations of the bending element are damped efficiently and rapidly so that less electronic effort is needed for the evaluation of the sensor element signals. The damping device e.g. has a resonance frequency of approximately 1 KHz.

The effect of the damping device starts immediately when the bending element develops the tendency to vibrate with resonance, provided that the absorbing mass is arranged close to the end of the bending element actuated by the thread.

The spring body is a structurally simple foam material body, rubber body or elastomeric body having intrinsic damping properties. To the contrary, the absorbing mass may be a metal sheet part or metal foil without intrinsic damping properties.

With a view to manufacture, the spring body is expediently glued to the bending element, while the absorbing mass is glued to the spring body such that a direct connection does not exist between the absorbing mass and the bending element.

In a particularly simple fashion the spring body may be a foam material strip, a rubber strip or an elastomeric strip while the absorbing mass is a sheet metal strip or a foil strip.

Finally, it may be expedient when for a certain embodiment the damping device consisting of the spring body and the absorbing mass is selected such that the oscillation amplitude of the absorbing mass is larger, preferably significantly larger, than the oscillation amplitude of the bending element at the fixing location of the absorbing mass.

BRIEF DESCRIPTION OF THE DRAWINGS

An embodiment of the invention will be described with the help of the drawing.

FIG. 1 shows a schematic side view of main components of a tensiometer T for measuring the thread tension of a thread Y (of a running and/or stopped thread Y).

DETAILED DESCRIPTION

The tensiometer T comprises a bending element B, e.g. a ceramic arm, which is secured at one end 2 in a stationary fixation location 1 and which extends with its other free end 3 towards the thread Y. A cover 4 may be provided at the end 3 where the cover 4 is matched in properties to the thread. The thread Y is deflected about the cover 4 in order to transmit the reaction force resulting from the thread tension onto the bending element B. Furthermore, expediently close to the fixation location 1, a sensor element E is arranged on the bending element B which derives a signal representing the thread tension from the bend of the bending element B. The sensor element E may be arranged at only one side of the bending element B or at both sides, and/or at least partly also in the fixing location or at the end of the bending element B. The end of the bending element B is prolonged beyond the fixation location 1.

According to the invention, the tensiometer T is equipped with a damping device D consisting of a spring body F and an absorbing mass M carried by the spring body F. The damping device D, e.g., is arranged at the lower side of the bending element B opposed to the thread Y and close to the end 3. The spring element F may be a body made from foam material, from rubber or from an elastomeric material having intrinsic damping properties. The body 7 may be glued at the location 7 onto the lower side of the bending element B. The absorbing mass M may be a sheet metal or a metal foil. The absorbing mass M may be even a flat strip 6 which is glued at a location 8 onto the spring body F, such that there is no possibility that the absorbing mass M comes into direct contact with the bending element B.

The absorbing mass M is substantially smaller than the mass of the bending element outside of the fixing location 1. The oscillation amplitude of the absorbing mass M as allowed by the spring body F relative to the bending element B is, in a preferred embodiment, expediently larger and preferably, even markedly larger than the oscillation amplitude of the bending element at the location of the damping device D. Furthermore, in some cases and expediently, the resonance frequency of the spring body F and of the absorbing mass M is adjusted about equal to the resonance frequency of the bending element B. This resonance frequency e.g. may amount to about 1 KHz.

As soon as the bending element B starts to oscillate under the influence of variations of the thread tension and/or of the friction of the thread Y at the bending element B and/or due to an excitation caused by external influences relative to the fixation location 1, and the bending element B tends to get into a resonance oscillation, the absorbing mass M is also excited to oscillate relative to the bending element B. The oscillations of the absorbing mass are allowed by the elasticity of the spring body F. At least a majority of the oscillation energy induced into the spring body F by the relative oscillations of the bending element and the absorbing mass M is dissipated in the spring body by intrinsic damping. In this way, the resonance oscillations of the bending element can be erased to a large extent, provided that a corresponding tuning exists between the bending element B and the damping device D.

The invention claimed is:

1. A tensiometer for measuring the tension of a thread comprising:
    a bending element which is fixed at one end and can be actuated at another end by the thread;
    at least one sensor element carried by the bending element; and
    a damping device for oscillating the bending element, wherein the damping device comprises at least one absorbing mass secured to the bending element by a spring body.

2. The tensiometer according to claim 1, wherein the absorbing mass is substantially smaller than a mass of the bending element outside of the fixing location.

3. The tensiometer according to claim 1, wherein resonance frequency of the spring body and the absorbing mass at least to a large extent correspond with a resonance frequency of the bending element.

4. The tensiometer according to claim 1, wherein the absorbing mass is arranged close to the end of the bending element which is actuated by the thread.

5. The tensiometer according to claim 1, wherein the spring body is a foam material body, a rubber body or an elastomeric body having intrinsic damping properties.

6. The tensiometer according to claim 1, wherein the absorbing mass is a metal sheet component or a metal foil without intrinsic damping properties.

7. The tensiometer according to claim 1, wherein the spring body is glued to the bending element, and the absorbing mass is glued to the spring body.

8. The tensiometer according to claim 1, wherein the spring body is a foam material strip, a rubber strip or an elastomeric material strip, and the absorbing mass is a sheet metal strip or a foil strip.

9. The tensiometer according to claim 1, wherein the oscillation amplitude of the absorbing mass is larger than an oscillation amplitude of the bending element at a location of the absorbing mass.

* * * * *